United States Patent [19]

Impink, Jr. et al.

[11] Patent Number: 5,176,885
[45] Date of Patent: Jan. 5, 1993

[54] ISOTOPE SEPARATION OF WEAK ACID FORMING ELEMENTS BY UTILIZATION OF THERMAL REGENERATION OF ION EXCHANGE RESIN

[75] Inventors: Albert J. Impink, Jr., Murrysville; Joseph A. Battaglia, Forest Hills, both of Pa.

[73] Assignee: Westinghouse Electric Corporation, Pittsburgh, Pa.

[21] Appl. No.: 677,948

[22] Filed: Apr. 1, 1991

[51] Int. Cl.⁵ ............................................ C01G 57/00
[52] U.S. Cl. .................................... 423/6; 423/249; 423/2; 252/626; 376/328; 210/660; 210/682
[58] Field of Search ................ 204/157.2; 423/2, 6, 423/249; 252/626; 376/328; 210/660, 682

[56] References Cited

U.S. PATENT DOCUMENTS

| | | | |
|---|---|---|---|
| 3,380,889 | 4/1968 | Loose | 376/219 |
| 3,666,626 | 5/1972 | Gramer et al. | 376/328 |
| 3,839,159 | 10/1974 | Dunnavant et al. | 376/308 |
| 4,059,670 | 11/1977 | Kakihana et al. | 423/7 |
| 4,073,683 | 2/1978 | Van der Schoot | 376/328 |
| 4,225,390 | 9/1980 | Brown et al. | 376/328 |
| 4,280,984 | 7/1981 | Miyake et al. | 423/6 |
| 4,302,424 | 11/1981 | Miyake et al. | 422/159 |
| 4,447,303 | 5/1984 | Jensen et al. | 204/157.1 R |
| 4,621,103 | 11/1986 | Kosuge et al. | 521/28 |
| 4,705,635 | 11/1987 | Knochel et al. | 210/633 |

OTHER PUBLICATIONS

An ANS Monograph "Isotope Separation", Stelio Villani Joint Research Centre of the European Communities, Brussels, Belgium, Published by American Nuclear Society pp. 61–63.
"Separation of Boron Isotope by Means of Weak-Base Anion Exchange Resin," Kotaka et al., Research Laboratory of Nuclear Reactor, 1973, Tokyo Institute of Technology. (Foreign Document—no translation).
"Liquid-Liquid Extraction System for the Enrichment of Stable Isotopes of Boron," Gerstenberger, H., pp. 285–289.
Development of Isotope Separation, Frejacques, C., Director, Division of Chemistry, CEA, pp. 11–16.

Primary Examiner—Brooks H. Hunt
Assistant Examiner—Ngoclan T. Mai

[57] ABSTRACT

A process and an apparatus are provided which separate the lower molecular weight isotope fraction from the higher molecular weight isotope fraction of an element which forms a water soluble acid at temperatures amenable to ion exchange. The separation is accomplished by shifting the equilibrium constants for absorption and desorption by temperature variations of the acidic solution. The process and apparatus are preferably employed to enrich a boric acid solution in its boron-10 isotope fraction by employing the use of ion exchange resins which are capable of thermally storing and releasing boron isotopes.

30 Claims, 2 Drawing Sheets

ISOTOPE SEPARATION OF WEAK ACID FORMING ELEMENTS BY UTILIZATION OF THERMAL REGENERATION OF ION EXCHANGE RESIN

TECHNICAL FIELD OF THE INVENTION

This invention pertains to the separation of isotopes by means of ion exchange for elements which form water soluble weak acids at temperatures amenable to ion exchange. Preferentially, the invention pertains to the separation of the boron-10 (B-10) isotope from the boron-11 (B-11) isotope by a thermally driven ion exchange process.

BACKGROUND OF THE INVENTION

A number of methods are known for increasing, by physical, chemical or combined processes the B-10 content of common boron compounds. These methods include distillation, solvent extraction, and ion exchange of the boron compounds.

One method for boron isotope separation is ion exchange of aqueous solutions of boric acid as discussed in "Separation of Boron Isotope by Means of Weak-Base Anion Exchange Resin", Kotaka et al., Research Laboratory of Nuclear Reactor, 1973, Tokyo Institute of Technology. In this study, aqueous solutions of boric acid were passed through ion exchange columns depositing borate ions on the resin. The resin was then eluted with pure water and the B-10 content of the effluent fractions were found to be enriched in the B-10 isotope at the end of the elution. It has also been shown that separation of the B-10 and the B-11 borate isotopes can be accomplished through ion exchange using hydrochloric acid to displace the boric acid molecules from the resin material. The employment of an ion exchange resin to separate isotopes of an element using a chemical reaction to effectuate the isotopic separation is discussed in *Isotope Separation*, Villani, S., American Nuclear Society at p. 61–63.

Natural boric acid solutions, containing a B-10 to B-11 atomic isotope ratio of 19.8:80.2, are used as control fluids in nuclear power plants. It is known that the B-10 isotope is responsible for nuclear reaction control due to its neutron capturing ability. B-10 enriched boric acid solutions, which contain a B-10 to B-11 atomic isotope ratio in excess of 19.8:80.2, are not currently employed in reactor coolant systems since the B-10 enriched solutions may cost as much as $3.00 (U.S.) per gram of B-10 while the reactor grade natural boric acid solution may only cost $1.00 (U.S.) per pound of boron. Therefore, it would be most advantageous to be able to enrich boron containing products in their B-10 content using an inexpensive process.

SUMMARY OF THE INVENTION

The invention provides a novel process and accompanying apparatus which allows for the isotopic enrichment of elements which are capable of forming water soluble weakly acidic solutions at temperatures amenable to ion exchange. Preferably, the inventive system is used to enrich a boric acid solution in the boron-10 (B-10) isotope, however, for example, such elements as silicon, phosphorus, arsenic and antimony can also be enriched. Elements which are suitable for enrichment are those transition elements (between the non-metal and metal part of the periodic table) which exist in several different valence states depending on the chemical environment, especially the temperature, of the solution containing the weakly acidic mixture. The enriched boric acid solution has significant commercial value in the nuclear reactor industry.

The process and apparatus of the present invention is most easily described by making reference to the enrichment of a specific element. The element boron will be chosen as the representative element for describing the process. A process is disclosed in which two ion exchangers are supplied initially with a boric acid solution absorbed on the resin, preferably a natural boric acid solution. A boric acid solution from a hot tank is pumped through a regenerative heat exchanger and then through a cooler and into the first ion exchanger. The resin in the first ion exchanger stores boron isotopes from the chilled boric acid solution and the solution then enters into a cold tank. Simultaneously the boric acid solution from the cold tank is pumped through the regenerative heat exchanger and then sent through a heater and into the second ion exchanger. The mass flow rate from the hot tank and the cold tank is preferably the same and is held constant. The heated solution preferentially removes B-10 boron isotopes from the resin and exits the second ion exchanger flowing into the hot tank. The second ion exchanger is referred to as the hot ion exchanger in this flow pattern and it produces a hot effluent. The flow is continued in this flow pattern and is monitored by reference to a "switchover ratio".

The switchover ratio is defined as the B-10:B-11 ratio of the hot ion exchanger effluent compared to, or divided by, the B-10:B-11 ratio of the hot tank solution. During the process of this flow pattern the B-10:B-11 ratio of the hot effluent will gradually rise, reach a peak, and then steadily fall to a point where it is below that of the hot tank solution. Therefore, the switchover ratio will be above 1.0 for a period of time and then drop below 1.0. The flow pattern is reversed at any time after the switchover ratio is greater than 1.0, and preferably when the switchover ratio begins to decrease, and most preferably when it drops to about 1.0. Continuing the flow pattern well beyond the time when the switchover ratio falls below 1.0 is not desirable and will result in a loss of the enrichment benefits of the inventive process.

The solution flow is reversed by pumping the boric acid solution from the hot tank through the regenerative heat exchanger and the cooler and then into the second ion exchanger where boron isotopes are absorbed by the resin. This solution then exits the second ion exchanger and enters into the cold tank. Simultaneously, the boric acid solution from the cold tank is pumped through the regenerative heat exchanger and through the heater and directed to the first ion exchanger where the heated solution preferentially absorbs B-10 isotopes from the resin and enters the hot tank. The regenerative heat exchanger is included to improve the enrichment obtained versus the energy expended ratio. The regenerative heat exchanger is thus an optional piece of equipment.

This flow is continued while the switchover ratio rises above 1.0 and is reversed to the original flow pattern when the switchover ratio has risen above 1.0 and preferably when the switchover ratio begins to decrease and most preferably when the switchover ratio drops to about 1.0. In this flow pattern the first ion exchanger produces the hot effluent.

The ion exchangers are rinsed at the end of an enrichment cycle and fresh natural boric acid is replaced onto the resins. The process can then be restarted using the same hot and cold tank solutions for further enrichment. This process produces an enriched B-10 boric acid solution in both the hot and cold tanks in which the ratio of B-10 to B-11 isotopes can be as high as desired.

It is an object of the present invention to provide an apparatus and process in which an inventory of an isotopically enriched solution is generated of an element which is capable of forming a water soluble weakly acidic solution at temperatures amenable to ion exchange by ciculating the solution through parallel ion exchange beds and alternatively heating and cooling the solution prior to injection into the respective parallel beds.

It is a further object of the present invention to provide an apparatus and process in which an inventory of a boron-10 isotopically enriched solution is generated by circulating a solution of boric acid and alternatively heating and cooling the solution and directing the solution through a plurality of ion exchange beds which store and release the boron isotopes based upon a thermally driven process.

DESCRIPTION OF THE PREFERRED EMBODIMENT

The isotopic enrichment of elements which are capable of forming a water soluble weakly acidic solution, and which incompletely dissociate in an aqueous solution at temperatures amenable to ion exchange, is accomplished by alternating the flow of hot and cold acidic solutions of the element of interest through ion exchange beds. Due to the mass transfer properties of the molecules containing the differing isotopes, and the temperature dependent ion exchange resin desorption and absorption of these molecules, the slight preferential desorption of the lower molecular weight isotope allows for the production of a solution which is isotopically enriched in the lower molecular weight isotope. Although reference is made to the ion exchange of the isotopes, it is noted that the ion exchange process is carried out upon the molecules containing these isotopes in solution.

The invention can be adapted for use with such elements as boron, silicon, phosphorous, arsenic, antimony, and other transition elements which form weakly acidic solutions at temperatures amenable to anionic ion exchange. The preferred element is boron and the isotopic enrichment of a boric acid solution in the B-10 isotope. The inventive process and apparatus will be described with reference to boron enrichment, however the invention should not be limited to the boron element. As used herein the term B-10 defines the boron isotope having ten (10) nucleons and the term B-11 defines the boron isotope having eleven (11) nucleons. A natural boric acid (NBA) solution has an atomic ratio of B-10 to B-11 isotopes of 19.8:80.2. A solution of boric acid is said to be enriched if the ratio of B-10 to B-11 isotopes is in excess of 19.8:80.2. Such a solution is an enriched boric acid (EBA) solution.

Figure 1:
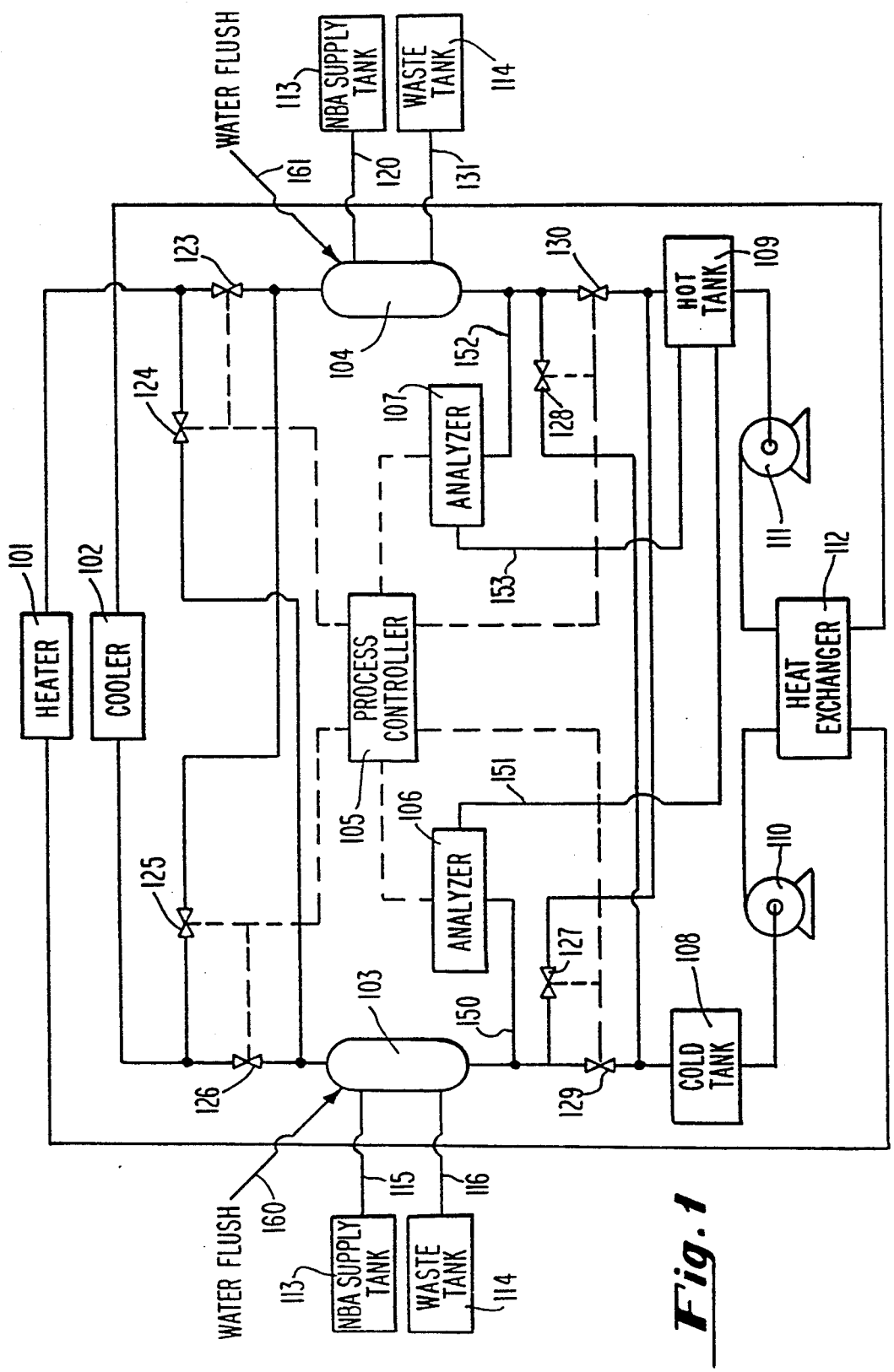
FIG. 1 is a process flow schematic diagram depicting a representative plant configuration to be used to generate a volume of enriched boric acid solution.

The inventive apparatus and process will be described referring to the enrichment of a boric acid solution. Reference is made to FIG. 1 in which an EBA generation system is shown which, using a raw feedstock solution, produces an EBA solution. The raw feedstock solution can be either a NBA solution or an EBA solution, however a NBA solution is preferred. A final product of EBA is obtained in both the cold tank 108 and the hot tank 109 at the end of the process.

The enrichment of the boric acid solution is accomplished as follows. The hot tank 109 and the cold tank 108 are filled with a solution of boric acid. The two ion exchangers-A and -B 103, 104 and the anion resin, preferably strong base anion exchange resin, contained therein are saturated with a NBA solution from the NBA supply tank 113 via NBA supply lines 115, 120. It should be noted that the starting solution to be enriched can be a natural boric acid solution or a solution already enriched in the B-10 isotope to some extent. The preferred starting solution is a NBA solution.

The enrichment process is begun by circulating the solution from the cold tank 108 through the ion exchanger-B 104 and into the hot tank 109. Simultaneously, the solution located in the hot tank 109 is circulated through the ion exchanger-A 103 and then into cold tank 108. This is accomplished by opening valves 123, 126, 129, 130 and closing valves 124, 125, 127, 128. The solution from the cold tank 108 is circulated through cold tank pump 110, through the regenerative heat exchanger 112 and then through heater 101, and then through the ion exchanger-B 104 and into the hot tank 109. In this way, molecules containing the B-10 isotopes are stripped preferentially over molecules containing the B-11 isotopes from the resin within the ion exchanger-B 104 producing a B-10 enriched boric acid solution in the hot tank 109. Simultaneously, the solution in the hot tank 109 is withdrawn from the hot tank 109 by the hot tank pump 111 to the regenerative heat exchanger 112 into the cooler 102 and then through the ion exchanger-A 103 and into the cold tank 108. In this way, boric acid is absorbed from the solution onto the resin within ion exchanger-A 103. The molecules containing the B-10 isotopes are preferentially absorbed over the molecules containing the B-11 isotopes by the resin in ion exchanger-A 103 during this step. Preferably, the mass flow rates through the two ion exchangers-A and -B 103, 104 are equal and are held constant throughout a flow pattern cycle so that the liquid levels in the hot tank 109 and the cold tank 108 remain relatively constant.

It is noted that other plant configurations could be proposed to heat the cold tank solution and to cool the hot tank solution prior to the ion exchange step. Any stream from a processing plant system could be employed in a heat exchanger step with the hot tank solution or the cold tank solution. Such engineering options could be readily employed with the inventive system. The cold tank 108, hot tank 109 and regenerative heat exchanger 112 design employed in the preferred embodiment with a heater 101 and cooler 102 as shown in FIG. 1 is one engineering alternative.

The preferred temperature range for the heated solution, upon exiting the heater 101 is about from 120°-160° F. and most preferably about 140° F. The preferred temperature range for the chilled solution, upon exiting the cooler 102 is about from 35°–70° F., and most preferably about 50° F.

The upper temperature limit for heating a solution to be sent through the ion exchanger is limited by the resin utilized. The highest temperature obtainable is preferred because the elution of borate ions is enhanced at higher temperatures. The lower temperature limit for cooling a solution to be sent through the ion exchanger is limited by the possible freezing of the solution. The lowest temperature is preferred because the storing of borate ions is enhanced at lower temperatures.

Figure 2:
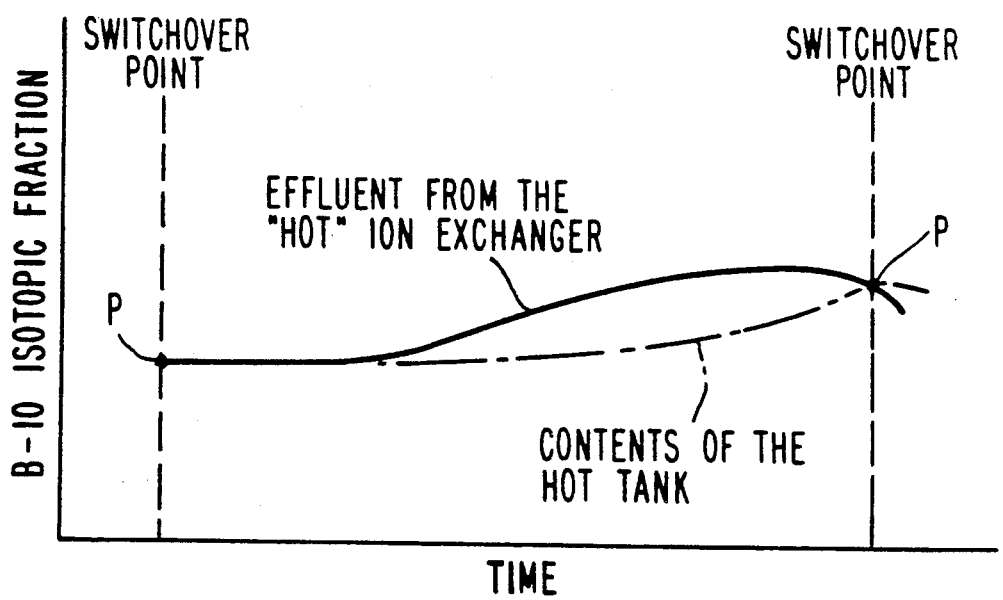
FIG. 2 is a graph indicating the time dependent boron-10 isotopic fraction in the effluent from a hot, i.e., boron stripping ion exchange bed.
Figure 3:
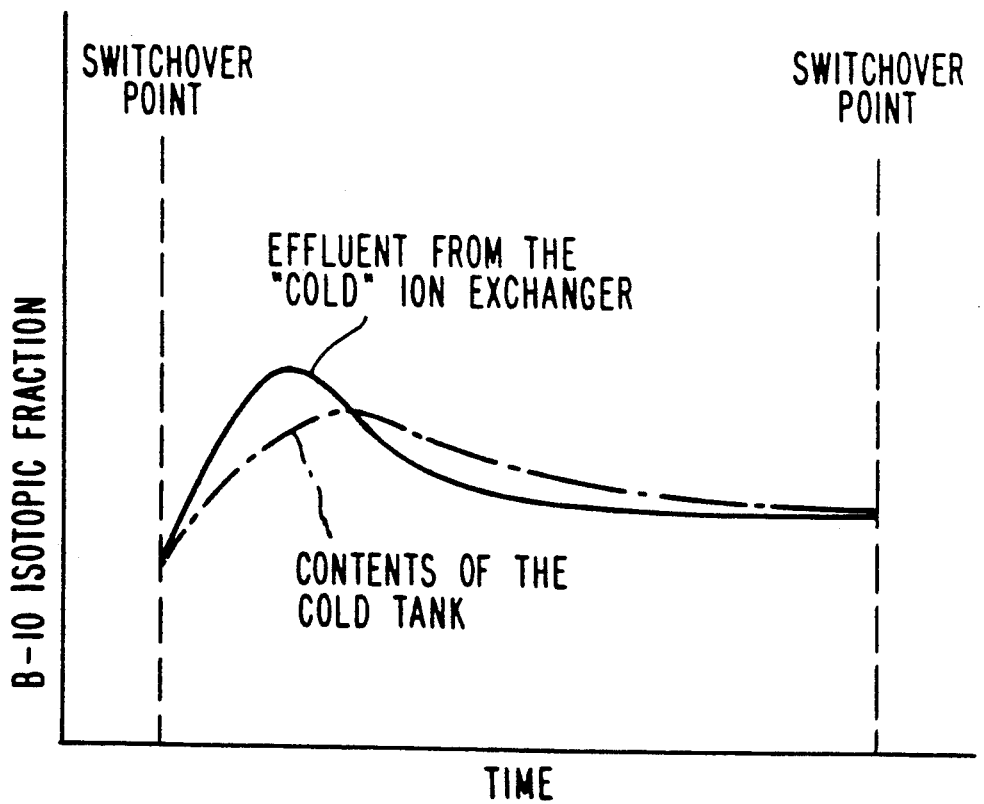
FIG. 3 is a graph indicating the time dependent boron-10 isotopic fraction in the effluent from a cold, i.e., boron storing ion exchange bed.

The B-10 concentration of the ion exchanger effluents and the cold tank solution and hot tank solution are shown in relative concentration units in FIG. 2 and FIG. 3. FIG. 2 represents the B-10 isotopic concentration of the effluent from an ion exchanger which has a hot solution circulating therethrough and the B-10 isotopic concentration in the hot tank 109. The preferential desorption of the B-10 isotope is shown by the rise in the B-10 isotopic concentration of the effluent as time proceeds. This increased desorption of B-10 isotopes in relation to B-11 isotopes will eventually decrease as time proceeds. Although not conclusively proven, the preferential desorption of B-10 isotopes is thought to be caused by different mass transfer rates between the B-10 and B-11 isotopes.

FIG. 3 represents the B-10 isotopic concentration of the effluent from an ion exchanger which has a cold solution circulating therethrough and the B-10 isotopic concentration in the cold tank 108. The initial peak of relatively enriched boric acid is caused by the fact that the flow of hot and cold solutions are switched between the two ion exchangers-A and -B, 103, 104 periodically. Therefore the initial peak is actually due to the residual solution from the prior hot solution circulation step.

The circulation pattern described above is switched periodically, and the flow from each tank is directed to the other ion exchanger. The switchover is regulated by the value of a "switchover ratio". This ratio is defined herein as the B-10:B-11 ratio of the hot ion exchanger effluent divided by the B-10:B-11 ratio of the solution in the hot tank 109. This quantity is represented by Equation 1:

$$\text{Switchover ratio} = \frac{\text{HOT EFFLUENT}(B\text{-}10 \text{ fraction})/(B\text{-}11 \text{ fraction})}{\text{HOT TANK}(B\text{-}10 \text{ fraction})/(B\text{-}11 \text{ fraction})} \quad \text{Eqn. (1)}$$

The preferred switchover point is shown in FIG. 2 as point P. The preferred flow pattern reversal is when the switchover ratio falls to about 1.0. However, the benefits of the present invention may be obtained by reversing the flow before or after this 1.0 value, represented in FIG. 2 as point P. The benefits of the present invention are realized when the switchover ratio is greater than 1.0. The benefits of the present invention are lost if the flow pattern is not reversed after the switchover ratio falls well below 1.0.

Referring to FIG. 1, switchover is accomplished by opening valves 124, 125, 127, 128 and closing valves 123, 126, 129, 130. The cold tank 108 solution is withdrawn by the cold tank pump 110 and sent through the regenerative heat exchanger 112 into the heater 101 and its flow is directed through ion exchanger-A 103 and onto the hot tank 109. In this way, molecules containing the B-10 boron isotopes are thermally desorbed from the resin in the ion exchanger-A 103 preferentially over the molecules containing the B-11 isotopes of boron. Simultaneously, the hot tank 109 solution is withdrawn by hot tank pump 111 through the regenerative heat exchanger 112 and transferred through the cooler 102 into ion exchanger-B 104 and then directed into cold tank 108. In this way, boric acid is absorbed by the resin within ion exchanger-B 104, and the molecules containing the B-10 isotopes are preferentially absorbed over the molecules containing the B-11 isotope. Again, it is preferred that the boric acid mass flow rates through the two ion exchangers are approximately equal and held constant during the flow pattern.

The reversed flow is continued while the switchover ratio rises above 1.0 and preferably continues until the switchover ratio falls near 1.0. However, the benefits of the inventive process can be obtained in a less efficient manner by reversing the flow prior to or after the 1.0 switchover value represented by Point P in FIG. 2. This process of alternating the flow from the hot tank 109 and the cold tank 108 through the ion exchanger-A 103 and ion exchanger-B 104 is continued until the ratio of B-10:B-11 boron isotopes in the EBA solution is at the desired level. When the enrichment can no longer practically be improved by the material remaining on the resins within the ion exchangers-A and -B 103, 104, then the resins can be replenished with a replacement solution of boric acid. This replacement solution may be a NBA or EBA solution, preferably a NBA solution. This is accomplished by flushing the ion exchangers-A and -B 103, 104 with a solution, such as water or a natural boric acid solution, and directing the flushed solution to the waste tank 114 via lines 116 and 131. The preferred flush solution is water heated to about 140° F. or most preferably to the limit of the resin material capabilities, and the water flush lines 160, 161 would be employed to flush the ion exchangers-A, -B 103, 104. The preferred replacement solution, natural boric acid, is then sent into the ion exchangers-A, -B 103, 104 from the natural boric acid supply tank 113 via NBA supply lines 115 and 120. If an EBA solution is the replacement solution, then an EBA solution would be sent into the ion exchangers-A, -B 103, 104.

In a preferred embodiment, the Valves 123, 124, 125, 126, 127, 128, 129, and 130 are all controlled by a process controller 105. The process controller accepts input from the two B-10 boron isotope analyzers 106, 107 to direct the flow into and out of the ion exchangers 103, 104. The preferred B-10 boron isotope analyzer 106, 107 is a mass spectrometer, for example, the Thermionic Quadrupole Mass Spectrometer THQ commercially available from Finnigan MAT, San Jose, Calif. When the flow from the cold tank is directed through the ion exchanger-A 103, then the B-10 analyzer 106 is used to determine the B-10:B-11 ratio in the stream exiting ion exchanger-A 103 via sample line 150. The B-10 analyzer 106 simultaneously determines the B-10:B-11 ratio from the hot tank 109 via sample line 151. It is assumed that the solution within the hot tank 109 is uniform for this sampling process. The sample line 151 can also be located on the outlet of the hot tank 109. When the preferred switchover point P, FIG. 2, is reached and the two ratios are approximately equal, the process controller 105 will automatically open and shut those valves necessary to reverse the flow.

The process controller 105 also controls the switch over when the hot boric acid solution is circulated through ion exchanger-B 104. The B-10:B-11 ratio is determined by the B-10 isotope analyzer 107 via sample lines 152 and 153 to again switch the flow pattern, preferably, when point P from FIG. 2 is realized. The sample line 153 can also be placed upon the outlet of the hot tank 109.

The process can be operated without the use of the on-line B-10 boron analyzers 106, 107. It has been found that the switch over time period is relatively constant. Therefore, once the process has begun, it is feasible to monitor the first switchover point P from FIG. 2 by sampling the proper sample lines 150, 151, 152, 153 and using an off-line B-10 analyzer (not shown). When the first switch over point is determined, that time can be used as the switching increment for further flow pattern reversals.

The above described process usually requires a multitude of flow pattern reversals in order for substantial enrichment to occur. To produce commercial scale quantities of EBA, the process could take months of continuous operation. The length of the process is dependent upon general factors of which are the volume of resin employed, the volume of boric acid to be enriched and the temperature of the hot and cold solutions.

The inventive process is advantageous over the prior art isotopic enrichment processes in that the storing and releasing of the isotopic compounds is controlled by a thermally driven process. The prior art enrichment processes relied upon chemically driven mechanisms for storing and releasing the isotopic compounds. The employment of the present inventive process allows a more economical process with increased efficiency without the need for successive interruptive steps of chemical elution to aid the isotopic enrichment process.

We claim:

1. A process for producing an inventory of an isotopically enriched acidic solution of an element that is capable of forming a water soluble weakly acidic solution at temperatures amenable to ion exchange having a lower molecular weight isotope fraction and higher molecular weight isotope fraction comprising:

storing on a resin within a first and second ion exchanger, an ion exchanger starting solution of the weakly acidic solution;

depositing a process starting solution of the weakly acid solution to a hot tank to form a hot tank solution and also into a cold tank to form a cold tank solution;

creating a first circulation pattern by circulating the hot tank solution through a means for cooling the hot tank solution and through the first ion exchanger and into the cold tank;

simultaneously circulating the cold tank solution through a means for heating the cold tank solution and through the second ion exchanger producing a hot effluent and directing the hot effluent into the hot tank;

continuing the first circulation pattern while a switchover ratio is greater than 1.0, wherein the switchover ratio is the ratio of the lower molecular weight isotope fraction to the higher molecular weight fraction in the hot effluent compared to that of the hot tank solution;

subsequently, creating a second circulation pattern by circulating the hot tank solution through the means for cooling the hot tank solution and through the second ion exchanger and into the cold tank;

simultaneously circulating the cold tank solution through the means for heating the cold tank solution and through the first ion exchanger producing the hot effluent and directing the hot effluent into the hot tank;

continuing the second circulation pattern while the switchover ratio is greater than 1.0 and subsequently switching back to the first circulation pattern;

whereby upon continually switching the circulation pattern the ratio of the lower molecular weight isotope fraction to the higher molecular weight isotope fraction increases in both the hot tank solution and the cold tank solution.

2. The process of claim 1, wherein the element is selected from the group consisting of boron, silicon, phosphorus, arsenic and antimony.

3. The process of claim 1, wherein the element is boron.

4. The process of claim 1, wherein the first and the second circulation patterns are continued until said switchover ratio is decreasing.

5. The process of claim 1, wherein said first and said second circulation patterns are continued until said switchover ratio is decreasing and falls to about 1.0.

6. The process of claim 1, wherein the hot tank solution is cooled by the cold tank solution in said means for cooling, and the cold tank solution is heated by the hot tank solution in said means for heating.

7. The process of claim 1, wherein the hot tank solution and the cold tank solution mass flow rates are equal.

8. A process for producing an inventory of boron-enriched boric acid which comprises:

storing on a resin within a first and second ion exchangers, an ion exchange starting boric acid solution;

depositing a process starting boric acid solution into a hot tank and into a cold tank forming a hot tank solution and a cold tank solution;

creating a first circulation pattern by circulating said hot tank solution through a means for cooling said hot tank solution and through said first ion exchanger producing a cold effluent and directing said cold effluent into said cold tank;

simultaneously circulating said cold tank solution through a means for heating said cold tank solution and through said second ion exchanger producing a hot effluent and directing said hot effluent into said hot tank;

continuing said first circulation pattern while a switchover ratio is greater than 1.0, wherein said switchover ratio is the ratio of the B-10 to B-11 isotope ratio in said hot effluent compared to the B-10 to B-11 isotope ratio in said hot tank solution;

subsequently, creating a second circulation pattern by circulating said hot tank solution through said means for cooling said hot tank solution and through said second ion exchanger producing said cold effluent and directing said cold effluent into said cold tank;

simultaneously circulating said cold tank solution through said means for heating said cold tank solution and through said first ion exchanger producing said hot effluent and directing said hot effluent into said hot tank;

continuing said second circulation pattern while said switchover ratio is greater than 1.0 and subsequently switching back to said first circulation pattern; and whereby upon continually switching the circulation pattern the ratio of B-10 to B-11 in said hot tank solution and said cold tank solution increases producing an enriched boric acid inventory.

9. The process of claim 8, wherein said first and said second circulation patterns are continued until said switchover ratio is decreasing.

10. The process of claim 8, wherein said first and said second circulation patterns are continued until said switchover ratio is decreasing and falls to about 1.0.

11. The process of claim 8, wherein the B-10 enrichment is continued until the B-10:B-11 ratio in the hot tank solution and in the cold tank solution is at least 25:75.

12. The process of claim 8, wherein the temperature of the hot effluent is higher than about 120° F.

13. The process of claim 8, wherein the temperature of the cold effluent is lower than about 50° F.

14. The process of claim 8, wherein the hot tank solution is cooled by the cold tank solution in the means for cooling and the cold tank solution is heated by the hot tank solution in the means for heating.

15. The process of claim 8, wherein said ion exchange starting boric acid solution is natural boric acid.

16. The process of claim 8, wherein said process starting boric acid solution is natural boric acid.

17. The process of claim 8, wherein the hot tank solution and the cold tank solution mass flow rates are equal.

18. The process of claim 8 which includes
stopping the circulation pattern;
flushing the first and second ion exchangers with a flush solution producing a spent solution of boric acid from the ion exchangers;
directing the spent solution to a waste tank;
regenerating the resins with a replacement boric acid solution; and
resuming the circulation pattern and the continuous switching.

19. The process of claim 18, wherein the B-10:B-11 ratio of the hot tank solution and the cold tank solution is at least 25:75.

20. The process of claim 18, wherein the replacement solution is a natural boric acid solution.

21. The process of claim 18, wherein the flush solution is water.

22. A process for producing an inventory of B-10 enriched boric acid which comprises:
storing on a resin within a first and second ion exchanges, a natural boric acid solution;
depositing a natural boric acid solution into a hot tank and into a cold tank forming a hot tank solution and a cold tank solution;
creating a first circulation pattern by circulating said hot tank solution through a means for cooling said hot tank solution and through said first ion exchanger producing a cold effluent and directing said cold effluent into said cold tank;
simultaneously circulating said cold tank solution through a means for heating said cold tank solution and through said second ion exchanger producing a hot effluent and directing said hot effluent into said hot tank;
continuing said first circulation pattern while a switchover ratio is greater than 1.0, wherein said switchover ratio is the B-10: B-11 isotope ratio in said hot effluent compared to the B-10:B-11 isotope ratio in said hot tank solution;
subsequently, when the switchover ratio is decreasing, creating a second circulation pattern by circulating said hot tank solution through said means for cooling said hot tank solution and through said second ion exchanger producing said cold effluent and directing said cold effluent into said cold tank;
simultaneously circulating said cold tank solution through said means for heating said cold tank solution and through said first ion exchanger producing said hot effluent and directing said hot effluent into said hot tank;
continuing said second circulation pattern while said switchover ratio is greater than 1.0 and switching back to said first circulation pattern when said switchover ratio is decreasing; and
whereby upon continually switching the circulation pattern the ratio of B-10 to B-11 in said hot tank solution and said cold tank solution increases producing an enriched boric acid inventory.

23. The process of claim 22, wherein the B-10 enrichment is continued until the B-10:B-11 ratio in the hot tank solution and in the cold tank solution is at least 25:75.

24. The process of claim 23, wherein the temperature of said hot effluent is at least about 120° F. and the temperature of said cold effluent is lower than about 50° F.

25. The process of claim 24, wherein the hot tank solution is cooled by the cold tank solution in said means for cooling and the cold tank solution is heated by the hot tank solution in said means for heating.

26. The process of claim 22, wherein the hot tank solution and the cold tank solution mass flow rates are equal.

27. The process of claim 22 which includes
stopping the circulation pattern;
flushing said first and second ion exchangers with a flush solution producing a spent solution of boric acid from said ion exchangers;
directing said spent solution to a waste tank;
regenerating said resin with a replacement boric acid solution; and
resuming said circulation pattern and said continuous switching.

28. The process of claim 27, wherein said flush solution is water.

29. The process of claim 27, wherein the B-10:B-11 ratio of the hot tank solution and the cold tank solution is from about 25:75 to 90:10.

30. The process of claim 27, wherein said replacement solution is natural boric acid.

* * * * *